United States Patent [19]

Yanagida et al.

[11] 4,442,829
[45] Apr. 17, 1984

[54] MATERIAL FOR SELECTIVE ABSORPTION OF SOLAR ENERGY AND PRODUCTION THEREOF

[75] Inventors: Kiyomi Yanagida, Suita; Tadashi Hirokane, Nagoya; Tadashi Tsukiyasu, Nagoya; Tomoari Sato, Nagoya, all of Japan

[73] Assignee: Sumitomo Aluminium Smelting Company, Ltd., Osaka, Japan

[21] Appl. No.: 915,299

[22] Filed: Jun. 13, 1978

[30] Foreign Application Priority Data

Jun. 14, 1977 [JP] Japan ................................. 52-70737

[51] Int. Cl.$^3$ .......................... F24J 3/02; C25D 11/22
[52] U.S. Cl. ..................................... 126/452; 126/901; 204/33; 204/35 N; 204/42
[58] Field of Search ................ 204/35 N, 38 A, 33, 204/42; 428/336, 469; 126/270, 271, 452, 901

[56] References Cited

U.S. PATENT DOCUMENTS

| | | | |
|---|---|---|---|
| 3,107,159 | 10/1963 | Fetzer | 204/35 N |
| 3,634,208 | 1/1972 | Kuroda | 204/35 N |
| 3,704,209 | 11/1972 | Patrie | 204/35 N |
| 3,917,887 | 11/1975 | Stiller | 427/343 |
| 3,929,593 | 12/1975 | Sugiyama | 204/35 N |
| 4,022,671 | 5/1977 | Asada | 204/35 N |
| 4,066,816 | 1/1978 | Sheasby | 428/336 |

FOREIGN PATENT DOCUMENTS 2128194  1/1973  Fed. Rep. of Germany ... 204/35 N

OTHER PUBLICATIONS

Metal Finishing Guidebook and Directory for 1978; Metals and Plastics Publications, Inc., Hackensack, N.J., p. 538.
The Aluminum Data Book, Reynolds Metals Co., Richmond, Va., 1958, p. 51.

*Primary Examiner*—G. L. Kaplan
*Assistant Examiner*—William Leader
*Attorney, Agent, or Firm*—Wenderoth, Lind & Ponack

[57] ABSTRACT

Materials comprising aluminum having a purity of 99.92% by weight or more as a substrate and a porous anodic oxide film of $3\mu$ or less in thickness formed on the surface of the substrate and metal particles electrochemically filled in the micropores of the anodic oxide film are used herein to selectively absorb solar energy. This solar energy absorbing characteristic is due to the fact that such materials have a large absorptivity in the visible and near the infrared range and have little emissivity in the infrared range. Such materials are produced by subjecting aluminum having a purity of 99.92% by weight or more to anodic oxidation, and then optionally to anodic electrolysis or alternating current electrolysis in an aqueous solution containing at least one acid selected from the group consisting of phosphoric acid, nitric acid and acetic acid, followed by electrolysis in an aqueous solution containing a metallic salt.

10 Claims, No Drawings

Wavelength (micron)

MATERIAL FOR SELECTIVE ABSORPTION OF SOLAR ENERGY AND PRODUCTION THEREOF

BACKGROUND OF THE INVENTION

1. Field of the Invention

The present invention relates to materials for the selective absorption of solar energy and production thereof. More particularly, it relates to materials for the selective absorption of solar energy and comprises applying anodic oxidation and electrolytic coloring to the surface of aluminum as a substrate, and the production thereof.

Since a large portion of solar energy is occupied by the visible and near infrared wavelength range, desirable materials for absorbing the energy are such that their absorption in the visible and near infrared wavelength range is large. On the other hand, the thermal energy absorbed tends to be emitted from the surface of the materials in the form of radiation energy, most of which is occupied by the infrared wavelength range. Accordingly, desirable materials for accumulating the absorbed energy by minimizing such radiation are such that their reflectance in the infrared wavelength range is large. That is, for the selective absorption of solar energy, there is a demand for the development of materials having a large absorbency in the visible and near infrared wavelength range and a large reflectance in the infrared wavelength range.

Aluminum has the following advantages as a raw material: (1) excellent heat conductivity, (2) light weight, (3) excellent mechanical processability and (4) excellent resistance to corrosion.

2. Description of the Prior Art

Proposals for the use of aluminum which has an electrolytically colored anodic oxide film on the surface thereof, as a material for the selective absorption of solar energy are disclosed, for example, in Japanese Patent Publication (unexamined) Nos. 113434/1975 and 3333/1976. In these proposals, however, an anodic oxide film of about $10\mu$ or more in thickness is formed as described in every example of the specification. When such an anodic oxide film having a large thickness has been electrolytically colored, its absorptivity in the visible and near infrared wavelength range is high. However, at the same time, it shows a large absorption in the infrared range as shown in FIG. 1-(a) (in the figure, large absorption is observed in the vicinity of $3\mu$ or $8\mu$ or more). Such materials are not desirable for selective absorption of solar energy since, even though they absorb solar energy, they emit most of the thermal energy in the form of radiation energy.

SUMMARY OF THE INVENTION

The present inventors ascertained that such a large absorption in the infrared range is due to the anodic oxide film, i.e. the aluminum oxide itself. Consequently, by making the anodic oxide film very thin, the absorption in the infrared range due to the aluminum oxide itself becomes very small and almost negligible. When the anodic oxide film is extremely thin, however, the commonly used aluminum or aluminum alloys can no longer be electrolytically colored.

The inventors examined the causes for this, and found the following. Hitherto, it has been well known that porous anodic oxide film having micropores of a uniform and definite shape is required for electrolytic coloring. But, the commonly used aluminum or aluminum alloy contains impurities or alloy components such as silicon, iron, copper, manganese, magnesium zinc and the like, or intermetallic compounds thereof. Therefore, when the anodic oxide film is extremely thin, a uniform film cannot be formed. In other words, the minute deposits that exert no adverse effect in a thick anodic oxide film form defects in it when the film is very thin, thereby damaging the uniformity of the film. In carrying out electrolytic coloring, these defects form electrochemically nonuniform points thereby causing a concentration of the electric current and making electrolytic coloring impossible.

For the reasons described above, the inventors extensively studied raw materials to form an anodic oxide film which can be electrolytically colored even when it is very thin. Particular attention was directed to high-purity aluminum which may be considered capable of forming porous anodic oxide film containing a trace amount of deposits and having micropores of an electrochemically uniform and definite shape. As a result, it was found that even a very thin anodic oxide film can be electrolytically colored by using aluminum having a purity of 99.92% by weight or more. The colored film thus obtained was measured for the absorption-reflection characteristic, and the selective absorption characteristic as shown in FIG. 1-(b) was obtained. It was also found that the thickness of the anodic oxide film needs to be $3\mu$ or less in order not to show a large absorption in the infrared range.

That is, the materials for selective absorption of solar energy according to the present invention comprise aluminum having a purity of 99.92% by weight or more as a substrate, a porous anodic oxide film of $3\mu$ or less in thickness formed on the surface of the substrate and metalloid particles electrochemically filled in the micropores of the anodic oxide film. They absorb solar energy to a large extent in the visible and near infrared range and emit the absorbed energy a little in the infrared range.

The process for producing materials for selective absorption of solar energy according to the present invention is carried out by subjecting aluminum having a purity of 99.92% by weight or more to anodic electrolysis thus forming an anodic oxide film having a thickness of $3\mu$ or less on the surface of the aluminum. The aluminum is then subjected to electrolysis in an aqueous solution containing a metallic salt, thereby filling the micropores in the anodic oxide film with deposits of the metal corresponding to the metallic salt.

The present invention will be illustrated in more detail.

Firstly, the purity of aluminum as a raw material should be 99.92% by weight or more. When the purity is less than 99.92% by weight, very thin anodic oxide films cannot be electrolytically colored as described above. Consequently, the films should be thicker in order to be electrolytically colored, which makes it difficult to endow them with the excellent property of selectively absorbing solar energy. More preferably, aluminum having a purity of 99.95% by weight or more is used. But, the whole of this aluminum need not have a purity of 99.92% by weight. It is sufficient that the purity alone of the surface to be anodized and electrolytically colored is 99.92% by weight or more. For example, the aluminum may be a clad material having aluminum of 99.92% by weight or more in purity as a skin, in order to improve its strength or to reduce its cost. The core of the clad material is not particularly limited, but generally 3003-alloy and 5052-alloy are suitable. The core need not be composed of aluminum alloys, but, e.g. copper, iron, stainless steel and the like may be used as the core.

The materials for the selective absorption of solar energy according to the present invention are those which are produced by forming a porous anodic oxide film of $3\mu$ or less in thickness on the surface of aluminum, and filling the micropores in the film with metalloid particles by an electrochemical process. The anodic oxide film needs to be porous in order for it to be filled later with metalloid particles electrochemically. Moreover its thickness needs to be $3\mu$ or less in order to endow it with the excellent property to selectively absorb solar energy. When the thickness exceeds $3\mu$, absorption in the infrared range appears as described above. Preferably, the thickness of the anodic oxide film is 0.1 to $1\mu$.

The surface of the selective absorption material is colored in various colors by the metalloid particles filled in the micropores of the anodic oxide film. These metalloid particles mainly absorb solar energy, and the energy absorbed is accumulated in the aluminum or absorbing medium such as a gas or liquid contacted therewith, thereby elevating the temperature of the aluminum or medium.

Next, an explanation will be given regarding a process for producing the materials for selective absorption of solar energy according to the present invention.

Firstly, aluminum having a purity of 99.92% by weight or more is used, and its surface needs to be smooth in order to minimize emissivity in the infrared range. For this purpose, it is desirable to apply pretreatments for smoothing and brightening, such as skin mill rolling, buff polishing, chemical polishing and electrolytic polishing. Of course, commercially available skin mill rolled aluminum may be used.

This aluminum is first subjected to anodic electrolysis to form a porous anodic oxide film of $3\mu$ or less in thickness on the surface. This is satisfactorily achieved under conditions wherein a sound oxide film is formed in the usual anodic oxidation baths containing sulfuric acid. Generally, a sulfuric acid concentration of about 10 to about 30% by weight, a bath temperature of about 15° to about 30° C. and a current density of about 0.1 to about 3 A/dm² are preferred operationally, but these conditions are not particularly limited to the foregoing ranges. In this case, what is necessary is to select such electrolysis conditions that an anodic oxide film of $3\mu$ or less in thickness is formed.

DETAILED DESCRIPTION OF THE INVENTION

Figure 1:
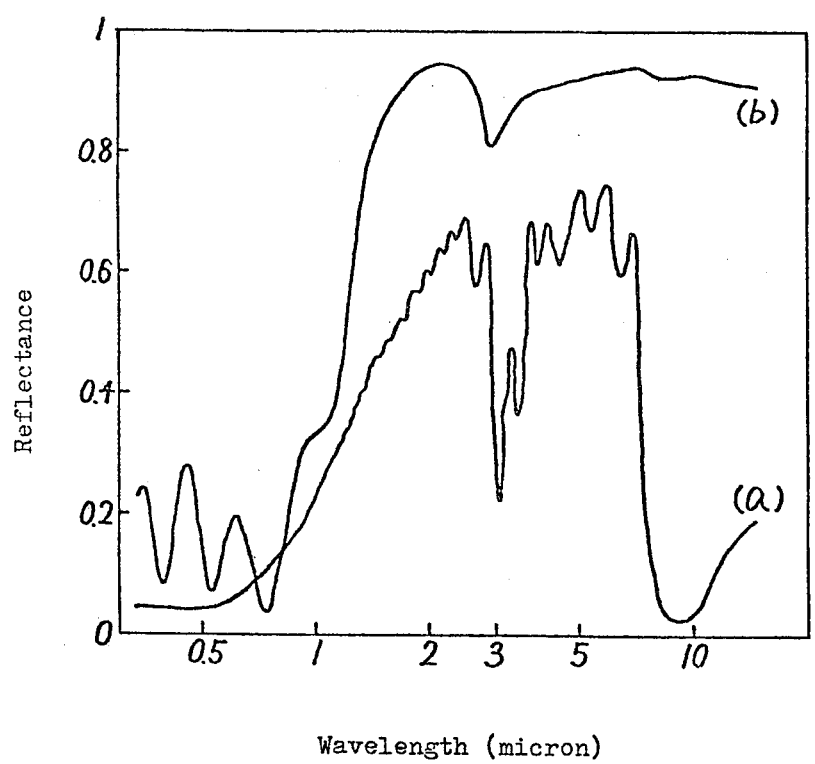
FIG. 1 shows absorption-reflection characteristics of colored aluminum according to the prior art (a) and according to the present invention (b).

In the process of the present invention, anodic oxide film of a particularly thin thickness needs to be electrolytically colored. Therefore, it is desirable to apply direct current anodic electrolysis or alternating current electrolysis to the aluminum previously anodized with a sulfuric acid bath in an aqueous solution containing at least one acid selected from the group consisting of phosphoric acid, nitric acid and acetic acid. In this case, the following treatment conditions are employed: For example, in the direct current anodic electrolysis with an electrolysis bath containing phosphoric acid, the concentration of phosphoric acid is preferably about 0.1 to about 30% by weight. If necessary, 0 to about 10% by weight of sulfuric acid may sometimes be added. The bath bath temperature is preferably about 5° to about 40° C.; and the electrolysis is preferably carried out at a bath voltage of about 5 to about 20 volts for about 0.1 to about 10 minutes. Since the bath voltage depends largely upon the shape of the vessel, electrode ratio and bath composition, the voltage sometimes exceeds the foregoing range.

The anodic oxide film of $3\mu$ or less in thickness thus-formed on the surface of the aluminum by anodic electrolysis in a sulfuric acid bath is a porous one having micropores of a diameter of 0.01 to $0.03\mu$ and which are situated from 0.02 to $0.1\mu$ apart from one another. The structure of this anodic oxide film is not largely changed by the subsequent direct current anodic electrolysis or alternating current electrolysis which is carried out, for example, in a phosphoric acid bath. The effect of this treatment consists in thinning the barrier layer or enlarging the pore diameter with little or no change in film thickness, thereby facilitating the subsequent electrolytic coloring. In this treatment, however, too long an electrolysis time and too high a bath temperature can lower the electrolytic coloring property. From this result, it cannot be said that the effect of this treatment increases by dissolving the film thereby enlarging the pore diameter. It may be considered that the fundamental structure of the porous anodic oxide film produced by the foregoing anodic electrolysis in a sulfuric acid bath is kept almost unchanged to the last. This point is also confirmed by electromicroscopic observation.

Aluminum having a porous anodic oxide film thus formed thereon is then electrolyzed in an aqueous solution containing a metallic salt whereby the micropores in the anodic oxide film are filled with deposits of the metal corresponding to the foregoing metallic salt. This treatment is the same as those commonly known as electrolytic coloring, for example, alternating current electrolysis with anodized aluminum as at least one electrode, direct current electrolysis with anodized aluminum as a cathode, or electrolysis having a separate treatment before or after these coloring electrolysis. This treatment may be carried out by any one of these methods. As the metallic salt, water-soluble salts of nickel, cobalt, copper, iron or tin may be used. Further, boric acid, ammonium salts, sulfuric acid or organic acids are generally added to the bath in order to regulate the electric conductivity and pH of the bath. The concentration of the metallic salt and electrolysis conditions depend upon the kind of metallic salt so that they are not particularly limited and the electrolysis conditions are optionally selected from the known ones for the commercial practice of electrolysis coloring.

Considering the uniformity of coloring and ease of electrolysis operation, however, it may be suitable to carry out the electrolysis with a current density of about 0.05 to about 3.0 A/dm², an electrolysis time of about 15 seconds to about 15 minutes and a bath temperature of about 10° to about 40° C. Particularly as to the bath temperature, high temperatures are more superior in uniformity and color deepening.

The thus obtained materials for the selective absorption of solar energy may be subjected to after-treatments such as sealing and coating.

The present invention will be illustrated with reference to the following examples, but the present invention is not limited to these examples.

All percentages in the examples are by weight unless others stated.

EXAMPLE 1

99.99% pure-aluminum plate (Si 15 ppm, Fe 15 ppm, Cu 50 ppm) was subjected to chemical polishing by dipping it in a chemical polishing bath comprising 70% of phosphoric acid, 3% of nitric acid and the rest of water at 95° C. for 1.5 minutes, and then rinsed with water. This test sample was anodized at 20° C. for 50 seconds, with a lead plate as a counter-electrode, in 15% sulfuric acid bath at a current density of 2 A/dm$^2$. Thus an oxide film of 0.5$\mu$ in thickness was formed. After rinsing with water, the anodized sample was subjected to anodic electrolysis at a constant voltage (11 v) for 4 minutes, with a lead plate as a counter-electrode, in an aqueous solution containing 10% of phosphoric acid and 1% of sulfuric acid having a temperature of 28° C. and then rinsed with water. Thereafter, the sample was arranged as a cathode in an aqueous solution containing 50 g/l of nickel sulfate and 30 g/l of boric acid, and electrolyzed at a bath temperature of 25° C. and a current density of 0.6 A/dm$^2$ for 2 minutes with a nickel plate as an anode. Thus, colored aluminum plate was obtained.

The absorption-reflection characteristic of this plate was measured, and the results as shown in FIG. 1-(b) were obtained. In this case, the average absorption in the visible and near infrared range was 0.80 and 0.08 in the infrared range.

COMPARATIVE EXAMPLE 99.9%-pure aluminum plate (Si 0.04%, Fe 0.05%) was treated in the same manner as in Example 1, but it was not colored.

On the other hand, this aluminum plate was treated in the same manner as in Example 1 except that anodic oxide film of 9$\mu$ in thickness was formed by the anodic oxidation for 15 minutes in the sulfuric acid bath. Thus, colored aluminum plate was obtained, and its absorption-reflection characteristic was as shown in FIG. 1-(a). In this case, an average absorption in the visible and near infrared range was 0.87 and an average absorptance in the infrared range was 0.69.

EXAMPLE 2

Figure 2:
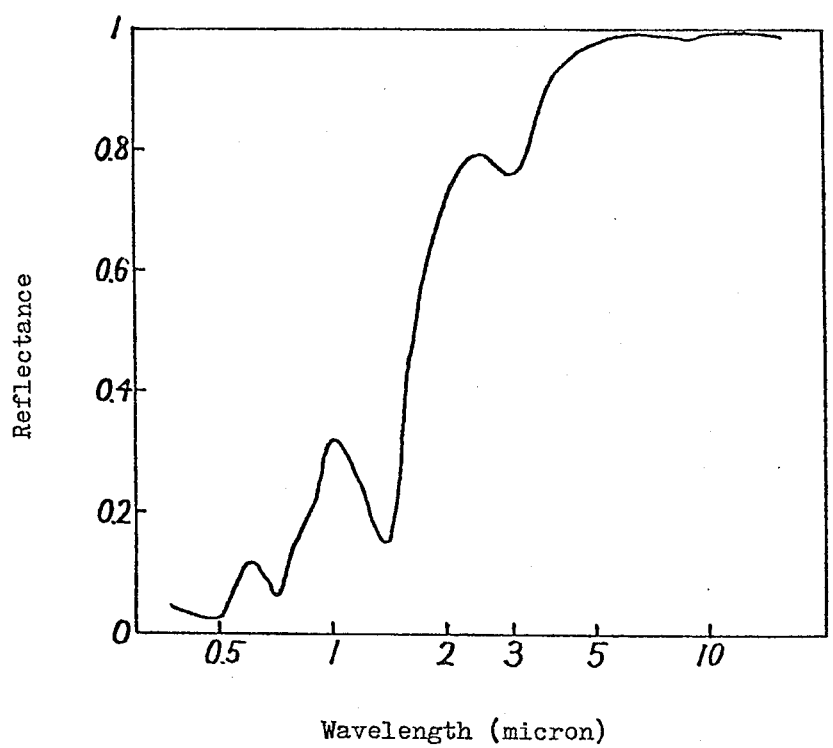
FIGS. 2 and 3 show the absorption-reflection characteristics of colored aluminum according to the present invention.

The same chemical polishing and anodic electrolysis in sulfuric acid bath and in phosphoric acid bath as in Example 1 were applied to 99.95%-pure aluminum plate (Si 0.014%, Fe 0.033%, Cu 0.003%) to form anodic oxide film of 0.5$\mu$ in thickness, followed by rinsing with water. Thereafter, this sample was electrolytically colored at 30° C., with a nickel plate as a counter-electrode, in an aqueous solution containing 50 g/l of nickel sulfate and 30 g/l of boric acid while changing the polarity of the sample alternatively in the following order:

Cathodic electrolysis: 0.6 A/dm$^2$, 15 seconds
Anodic electrolysis: 7 V, 10 seconds
Cathodic electrolysis: 0.6 A/dm$^2$, 10 seconds
Anodic electrolysis: 7 V, 10 seconds
Cathodic electrolysis: 0.6 A/dm$^2$, 10 seconds The absorption-reflection characteristic of the colored aluminum plate thus obtained was measured, and the result as shown in FIG. 2 was obtained. In this case, an average absorption in the visible and near infrared range was 0.87 and that in the infrared range was 0.02.

EXAMPLE 3

99.99%-pure aluminum plate (Si 15 ppm, Fe 15 ppm, Cu 50 ppm) was subjected to the same chemical polishing as in Example 1 and then rinsed with water. This sample was anodized at 20° C. for 50 seconds, with a lead plate as a counter-electrode, in 15% sulfuric acid bath at a current density of 2 A/dm$^2$. Thus an oxide film of 0.5$\mu$ in thickness was formed. This sample was rinsed with water and then subjected to alternating current electrolysis at a bath temperature of 20° C. for 10 minutes, with carbon as a counter-electrode, in an aqueous solution containing 50 g/l of nickel sulfate and 30 g/l of boric acid at a current density of 0.3 A/dm$^2$.

Figure 3:
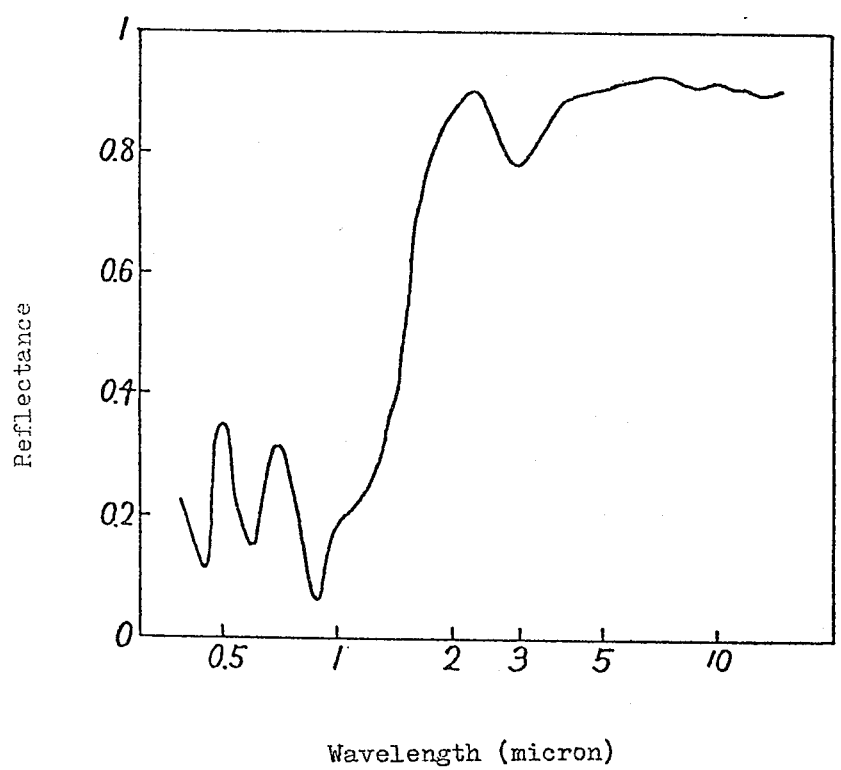

The absorption-reflection characteristic of the colored aluminum plate thus obtained was measured, and the result as shown in FIG. 3 was obtained. In this case, an average absorption in the visible and near infrared range was 0.77, and that in the infrared range was 0.09.

According to the present invention, as described above, there are provided selective absorption materials having a large absorbency in the visible and near infrared range and a large reflectance (small absorption) in the infrared range, that is, having a large absorption of solar energy and a small emissivity of the absorbed thermal energy.

What is claimed is:

1. In a method for selectively absorbing solar energy with an aluminum material having a porous anodic oxide film thereon and metal particles electrochemically filled in the micropores of the anodic film by exposing the said aluminum material to solar energy to absorb said energy, the improvement which comprises using, as the aluminum material, aluminum having a purity of 99.92% by weight or more as a substrate and having a porous anodic oxide film of 1$\mu$ or less in thickness formed on the surface of the substrate, which film has metallic particles electrochemically filled in the micropores of the anodic film, said improved material having infrared solar energy absorbing characteristics in the visible and near infrared range, and lowered radiation of the absorbed thermal energy in the infrared range.

2. A method according to claim 1, wherein said aluminum has a purity of 99.95% by weight or more.

3. A method according to claim 1, wherein said aluminum is a clad material having aluminum of 99.92% by weight or more in purity as a skin material.

4. A method according to claim 1, wherein the thickness of said anodic oxide film is 0.1 to 1$\mu$.

5. The method according to claim 1, wherein said anodic oxide film is formed by anodic oxidation in an aqueous solution containing sulfuric acid.

6. The method according to claim 1, wherein said anodic oxide film is formed by anodic oxidation in an aqueous solution containing sulfuric acid followed by anodic electrolysis or alternating current electrolysis in an aqueous solution containing at least one acid selected from the group consisting of phosphoric acid, nitric acid and acetic acid.

7. A process for producing an aluminum material useful for the selective absorption of solar energy, which comprises preparing aluminum having at least the surface of which has a purity of 99.92% by weight or more, applying said aluminum to a pre-treatment for smoothing and brightening; forming a porous anodic oxide film of 1μ or less in thickness on the surface of said aluminum by anodic oxidation in an aqueous solution containing sulfuric acid; electrolyzing said anodically oxidized aluminum with an anodic direct current or alternating current in an aqueous solution containing at least one acid selected from the group consisting of phosphoric acid, nitric acid and acetic acid, and then filling the micropores of said anodic oxide film with metal deposits by electrolysis in an aqueous solution containing a corresponding metallic salt.

8. A process according to claim 7, wherein said anodic electrolysis or alternating current electrolysis is carried out in an aqueous solution containing 0.1 to 30% by weight of phosphoric acid and in addition 0 to 10% by weight of sulfuric acid may be added.

9. A process according to claim 7, wherein said electrolysis in an aqueous solution containing a metallic salt is carried out by alternating current electrolysis with the anodic-electrolyzed aluminum as at least one electrode.

10. A process according to claim 7, wherein said electrolysis in an aqueous solution containing a metallic salt is carried out by direct current electrolysis with the anodic-electrolyzed aluminum as a cathode.

* * * * *